United States Patent [19]

Groff

[11] Patent Number: 4,694,743
[45] Date of Patent: Sep. 22, 1987

[54] METHOD AND APPARATUS FOR FRYING PRODUCT

[76] Inventor: Horace E. Groff, Box 176, School Rd., Bowmansville, Pa. 17507

[21] Appl. No.: 802,164

[22] Filed: Nov. 25, 1985

[51] Int. Cl.$^4$ ............................................. A47J 37/12
[52] U.S. Cl. ...................................... 99/405; 99/403; 99/407
[58] Field of Search ................. 99/404, 405, 406, 407, 99/403; 426/438, 523; 126/391

[56] References Cited

U.S. PATENT DOCUMENTS

| | | | |
|---|---|---|---|
| 1,686,596 | 10/1928 | Betz | 99/405 X |
| 2,056,845 | 10/1936 | Ferry | 99/405 |
| 2,085,494 | 6/1937 | Ferry | 99/405 |
| 2,130,082 | 9/1938 | Ferry | 99/405 |
| 2,176,624 | 10/1939 | Ferry | 99/405 |
| 2,552,441 | 5/1951 | McBeth | 99/405 |
| 2,666,427 | 1/1954 | Keating | 126/391 |
| 3,757,672 | 9/1973 | Szabrak | 99/404 |
| 4,488,478 | 12/1984 | Leeper | 99/407 X |

*Primary Examiner*—Timothy F. Simone
*Attorney, Agent, or Firm*—Harvey B. Jacobson

[57] ABSTRACT

An elongated vat of heated cooking liquid such as coil is provided and slices of raw potato are admitted into one end of the tank and moved longitudinally of the latter toward the other end of the tank. As the potato slices reach the other end of the tank, they are removed therefrom. The potato slices are conveyed longitudinally of the tank through the utilization of inversely cyclically moved frames suspended above the vat and extending longitudinally thereof with each frame including a plurality of depending fingers spaced both longitudinally and transversely of the tank. Each frame is lowered from a starting position with the fingers thereof spaced above the level of cooking oil in the tank to a position with the fingers extending through the cooking oil level. Thereafter, each frame is moved longitudinally of the tank toward the discharge or other end thereof, subsequently elevated to a position with the fingers of the frame spaced above the level of cooking oil in the tank and then moved back toward the inlet end of the tank to the starting position thereof.

11 Claims, 12 Drawing Figures

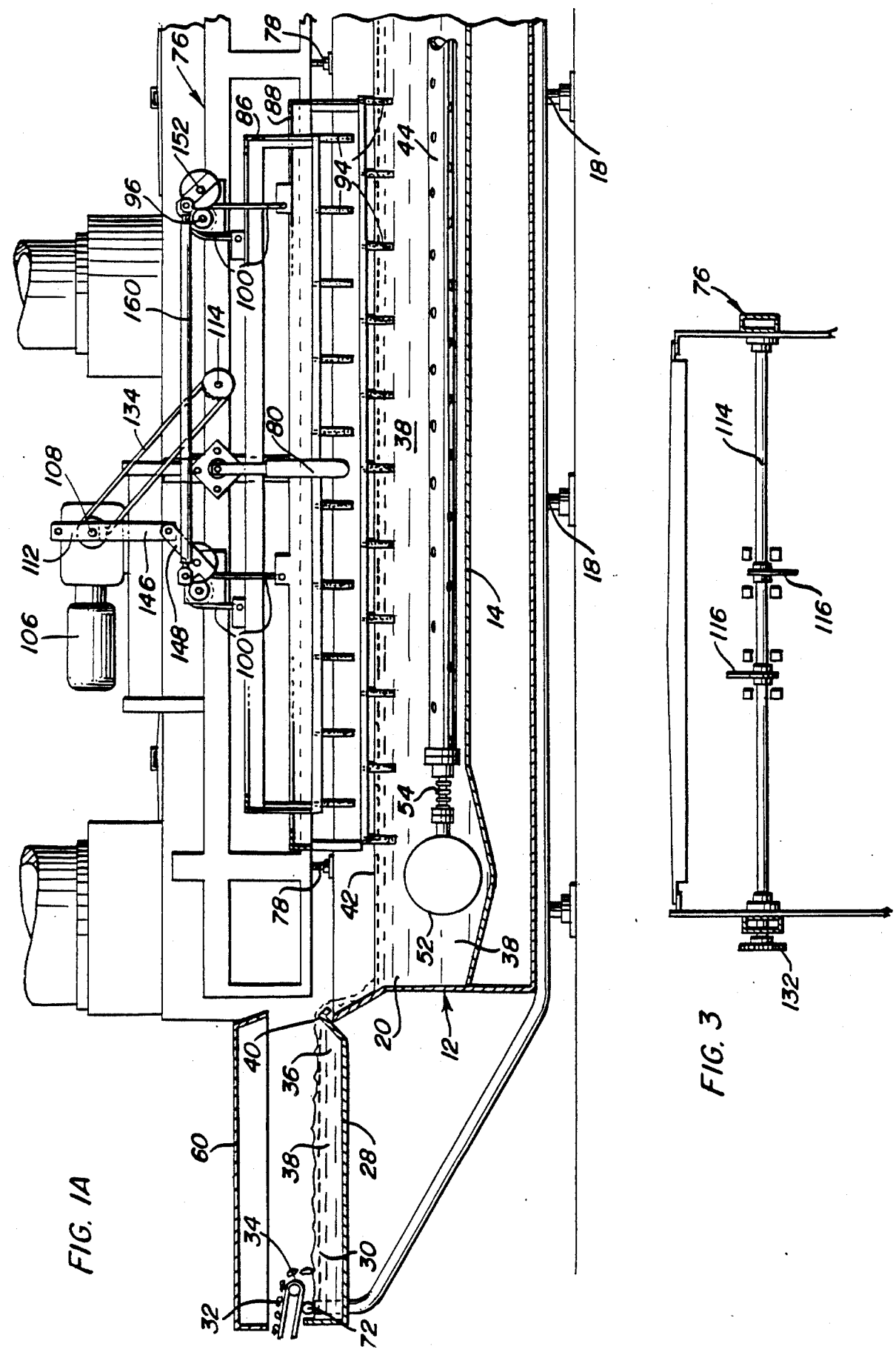

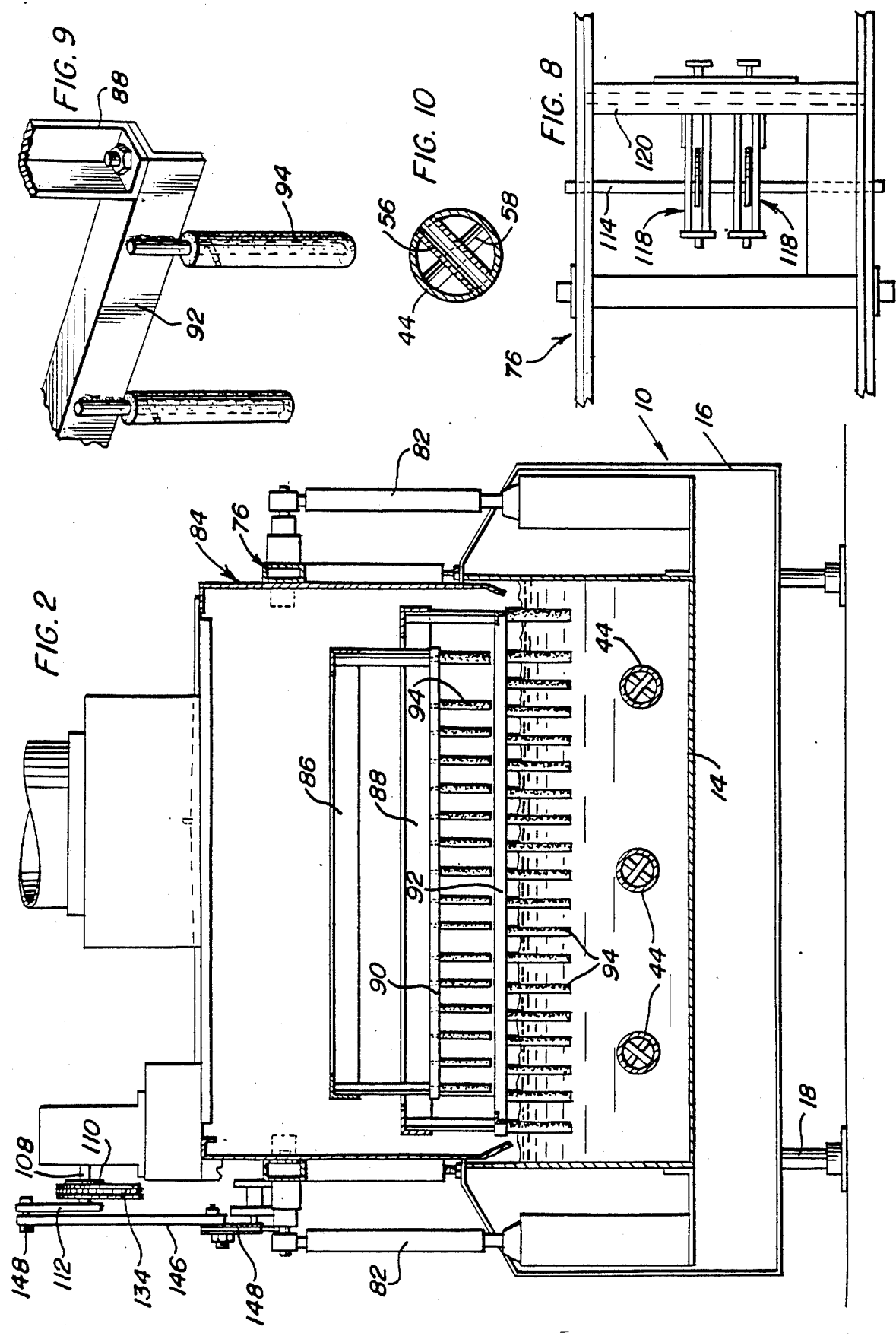

METHOD AND APPARATUS FOR FRYING PRODUCT

BACKGROUND OF THE INVENTION

1. Field of the Invention

This invention relates to a vat of heated cooking liquid, such as oil for cooking food product slices, such as potato slices, and incorporates structure operative to agitate, depress, move and turn the potato slices being cooked and tending to float on the surface of the oil as the slices move from the inlet end of the vat to the outlet end thereof.

2. Description of Related Art

Various different apparatuses heretofore have been utilized for cooking potato slices in the production of potato chips. Many of these previously known devices incorporate overlying conveyors for depressing the potato slices into the cooking oil and which tend to prevent the potato slices from curling naturally and causing potato skins to stick together during the cooking process and other devices utilize paddles for agitating the potato slices during the cooking process and propelling the potato slices from one end of a cooking vat to the other. Further, these previously known forms of potato slice cooking devices, for the most part, have utilized elevated cooking temperatures for accomplishing the desired cooking process with the result that the moisture content of the potato slices being cooked is driven therefrom at excessive speed resulting in a breakdown of the fiber cells of the potato slices and an excessive amount of cooking oil being absorbed by the potato slices during the cooking operation. The excess absorption of cooking oil by the potato slices results not only in the cooked product containing an excess amount of oil but also the consumption of larger quantities of oil during the cooking process and thus a greater expense involved in cooking potato slices on a large volume basis.

Accordingly, a need exists for an improved form of potato slice cooking apparatus which will enable a slower cooking time with the same volume of production and a cooking apparatus which will allow the potato slices being cooking to curl more naturally during the cooking process and further prevent adjacent potato slices from sticking together during the cooking process.

SUMMARY OF THE INVENTION

The apparatus of the instant invention is specifically designed for cooking potato slices in the production of potato chips, but the operational features of the invention could be utilized, either with of without minor modifications, for the cooking of other food products. In addition, the apparatus utilizes a somewhat different method of cooking potato slices resulting in potato chips which have a considerably lower oil content and which therefore are more desirable and represent a savings in cooking oil to the potato chip manufacturer.

The apparatus utilizes a somewhat conventional elongated vat of cooking oil for cooking potato slices and wherein heat tubes are disposed within the cooking oil below the surface thereof for maintaining the cooking oil at a proper cooking temperature. The heat tubes, however, include transverse inclined tubular passages formed therethrough for the convection flow of cooking oil over increased area heating surfaces of the heating tubes. In addition, the apparatus includes structure by which the potato slices, which have a tendency to clump together and float on the surface of the cooking oil, may be agitated, alternately depressed and released and turned throughout the cooking process as well as conveyed from one end of the cooking vat to the other.

The main object of this invention is to provide an apparatus for producing potato chips from raw potato slices and which will produce a potato chip which has approximately 30% lower oil content and which therefore utilizes considerably less cooking oil in a production line process of cooking potato slices.

Another object of this invention is to provide an apparatur for cooking potato slices that will enable a longer cooking time for the potato slices in generally the same size cooking vat without a reduction in production.

Still another important object of this invention is to provide an apparatus for cooking potato slices in the production of potato chips and which incorporates an improved method of cooking the potato slices into potato chips in a manner such that a savings in cooking oil is obtained as well as an increase in the natural flavor of the cooked potato chip.

Yet another important object of this invention is to provide an apparatus for cooking potato slices which will allow the potato slices being cooked to more naturally curl.

A further object of this invention is to provide an apparatus for cooking potato slices which will enable thicker potato slices to be cooked over a longer period of time and yet which will result in the same production of potato chips as is accomplished by conventional potato slice cooking devices.

Still another important object of this invention is to provide an apparatus which will be capable of cooking potato slices by a method that will result in the potato slices having more flavor, more natural curling and being more crisp.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1A is a fragmentary longitudinal vertical sectional view of the inlet end of an apparatus designed specifically for the cooking of potato slices;

FIG. 2 is a transverse vertical sectional view taken substantially upon the plane indicated by the sectional line 2—2 of FIG. 1B;

FIG. 3 is a schematic transverse sectional view illustrating the mounting of one of the cam shafts of the apparatus;

FIG. 8 is a fragmentary top plan view of a portion of the overhead frame of the apparatus from which a pair of the cam followers illustrated in FIGS. 4 and 5 are reciprocately mounted;

FIG. 9 is a fragmentary perspective view of one lower corner portion of one of the finger equipped frames;

FIG. 10 is an enlarged transverse sectional view of one of the heat tubes illustrating the oppositely inclined oil flow passages extending therethrough.

DESCRIPTION OF THE PREFERRED EMBODIMENT

Figure 1B:
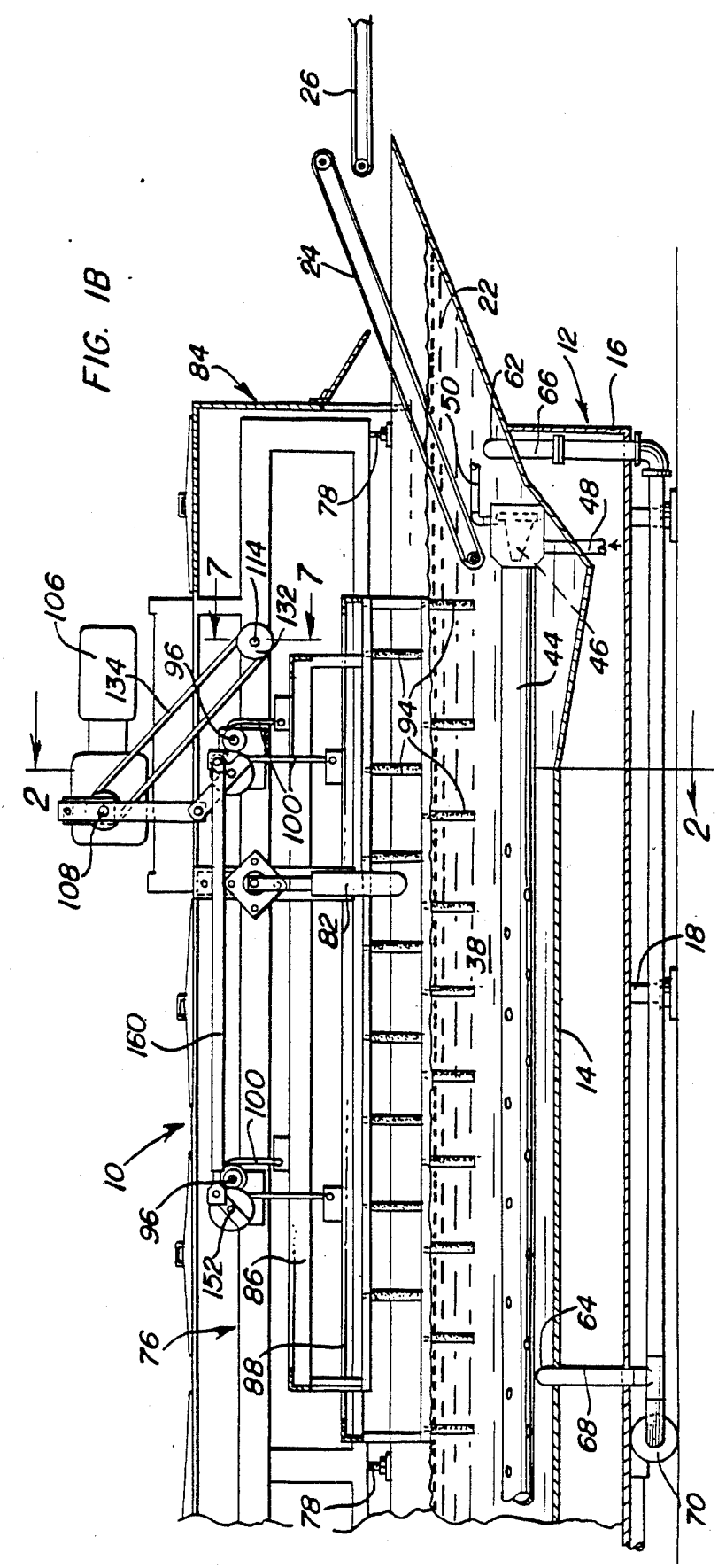
FIG. 1B is a longitudinal vertical sectional view of the discharge end of the apparatus.

Referring now more specifically to the drawings and to FIGS. 1A and 1B, the apparatus of the instant invention is referred to in general by the reference numeral 10 and includes a lower elongated vat referred to in general by the reference numeral 12. The vat 12 includes an interior elongated tank 14 enclosed within an outer housing 16 equipped with support legs 18 and the tank 14 includes a raw food product inlet end 20 and a cooked food product outlet end 22. The outlet end 22 has a discharge conveyor 24 operatively associated therewith for discharging cooked food products from the outlet end 22 and discharging those products from the discharge conveyor 24 onto a second conveyor 26. An initial raw food product receiving vat or tank 28 is operatively associated with the inlet end 20 of the tank 14 and includes and inlet end 30 into which raw food products such as slices 32 of raw potatoes are discharged from a conveyor 34. The tank or vat 28 includes a discharge end 36 and has a quantity of heated cooking liquid such as oil 38 disposed therein. The discharge end 36 includes a weir-type outlet 40 over which the oil 38 supplied to the tank 28 in a manner to be hereinafter more fully set forth may be discharged in a manner also carrying the slices 32 floating on the oil 38 over the weir-type outlet 40 and into the inlet end 20 of the tank 14, the latter also having cooking oil 38 disposed therein to a predetermined level 42.

Three longitudinally extending and transversely spaced heat tubes 44 are disposed within the lower portrion of the tank 14 and include burners 46 at the outlet end 22 of the tank 14 to which air and gas are supplied through supply pipes 48 and 50. The ends of the heat tubes adjacent the inlet end 20 are coupled to a transverse outlet flue pipe 52 by expandable connections 54 and the pipe 52 discharges through one side of the tank 14 into a suitable flue pipe (not shown). Further, each of the heat tubes 44 includes a plurality of longitudinally spaced and oppositely inclined diametric tubes 56 and 58 secured therethrough. The tubes 56 and 58 provide additional heat transfer surfaces and allow the oil 38 within the tank 14 to pass upwardly therethrough, by convection, in order to more effectively heat the oil 38 throughout the length of the tubes 44.

The tank 28 includes a cover 60 and the tank 14 includes a plurality of oil outlets 62 and 64, see FIG. 1B, from which pipes 66 and 68 extend, the pipe 68 opening into the pipe 66 and the latter having a pump 70 serially connected therein. The pipe 66 extends from the outlet 62 to an inlet manifold 72 within the tank 28 for discharging the oil 38 pumped by the pump 70 into the tank 28 at the end thereof remote from the weir-type outlet 40. Thus, when slices 32 are discharged from the conveyor 34 into the tank 28, they are quickly conveyed to the weir-type outlet 40 and pass thereover into the tank 14.

A support frame referred to in general by the reference number 76 is supported from the upper portion of the housing 16 through the utilization of adjustable feet 78, see FIGS. 1A and 1B, and the inlet and outlet ends of the housing 16 include opposite side jack assemblies 80 and 82 for selectively raising and lowering the frame 76 relative to the tank 12 and housing 16. The frame 76 is enclosed within a downwardly opening housing referred to in general by the reference numeral 84 and including various removable cover panels (not shown).

The frame 76 supports a pair of inner and outer generally rectangular frames 86 and 88 over each end of the tank 14 and the frames 86 and 88 include longitudinally spaced, transversely extending and dependingly supported transverse bars 90 and 92, respectively, with each of the bars 90 and 92 including longitudinally spaced depending fingers 94 supported therefrom, see FIG. 2.

Figure 7:
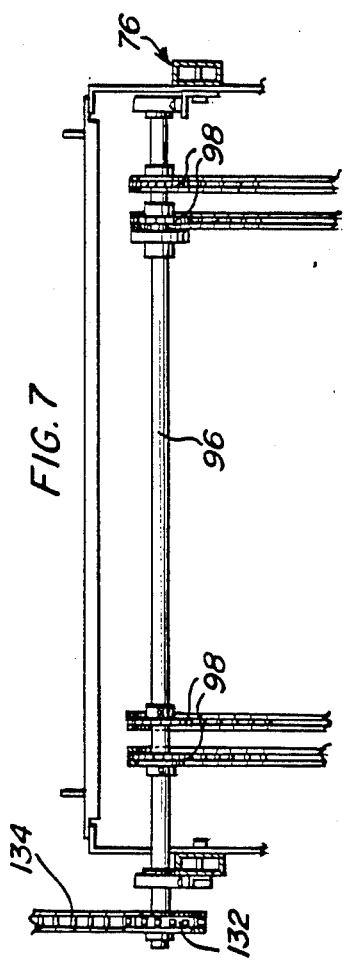
FIG. 7 is a transverse vertical sectional view taken substantially upon the plane indicated by the section line 7—7 of FIG. 1B illustrating the oscillatable shaft by which one pair of corresponding ends of the finger equipped frames are raised and lowered.
Figure 4:
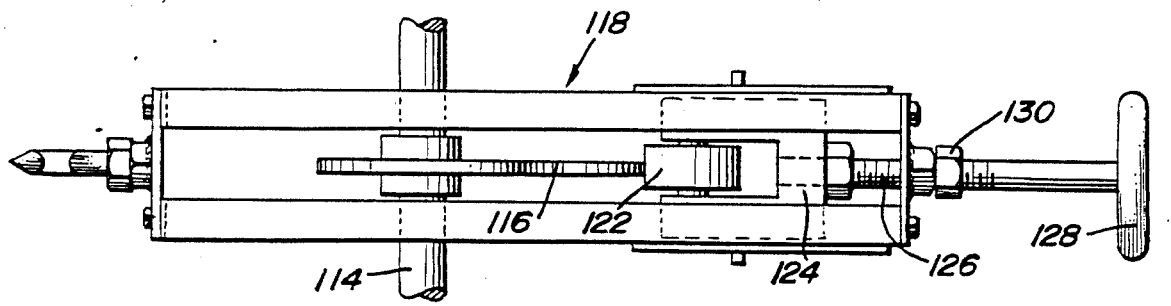
FIG. 4 is a fragmentary top plan view of one of the cam shafts and the attendant cam follower slide.
Figure 5:
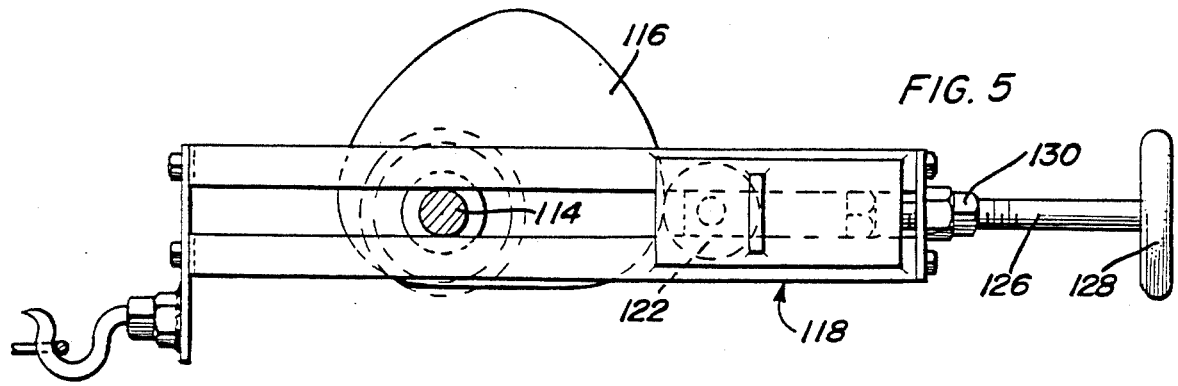
FIG. 5 is a side elevational view of the assemblage illustrated in FIG. 4 with the near end of the cam shaft illustrated in vertical section.

Each end of the frame 76 journals a pair of longitudinally spaced transverse shafts 96 therefrom, see FIG. 1B, and each shaft 96 includes opposite end pairs of sprocket wheels 98 mounted thereon, see FIG. 7. Further, each sprocket wheel 98 has one end of a link chain 100 at least partially trained thereabout and secured thereto as at 102, see FIG. 6. The other end of the each link chain 100 depends downwardly therefrom and is attached to one of the corresponding frames 86 and 88. The upper ends of each pair of chains 100 have their lower ends anchored relative to different frames 86 and 88 and their upper ends are partially trained about the corresponding sprocket wheel 98 in opposite directions. Accordingly, upon oscillation of the shafts 96, each pair of frames 86 and 88 are inversely vertically oscillated.

Figure 6:
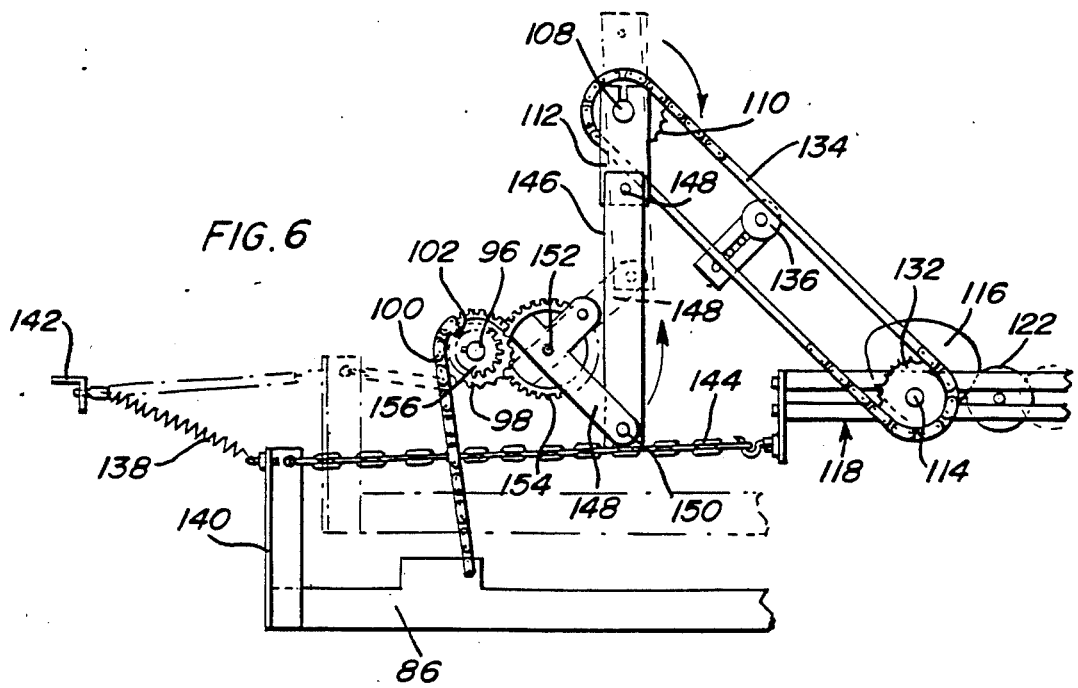
FIG. 6 is a side elevational schematic view illustrating the cam and lifting mechanism by which one of the chain suspended food product engaging finger equipped frames is longitudinally and vertically oscillated related to the vat.

Each end of the frame 76 supports a variable speed motor 106 and each motor 106 drives a transverse shaft 108 having a sprocket wheel 110 mounted thereon, see FIG. 6, as well as a crank arm 112. Each end of the frame 76 additionally journals a transverse cam shaft 114 therefrom, see FIG. 3, and each cam shaft 114 includes a pair of cam lobes 116 mounted thereon. Each cam lobe 116 has a cam follower assembly referred to in general by the reference numeral 118 operatively associated therewith and each cam follower assembly 118 is guidingly supported for longitudinal rectilinear movement longitudinally of the frame 76 from a corresponding transverse truss 120 of the frame 76, see FIG. 8. The follower assemblies 118 each include a cam follower roller 122 journaled therefrom and mounted for adjustable shifting longitudinally of the corresponding cam follower assembly 118 through the utilization of a yoke 124 from which the roller 122 is journaled and an adjustment screw 126 from which the corresponding yoke 124 is mounted, the screw 126 being threadedly supported from the cam follower assembly 118 and including a handle 128 thereon as well as a lock nut 130 whereby the adjustment screw 126 may be adjusted and locked in adjusted position.

One end of each cam shaft 114 is provided with a sprocket wheel 132 and each shaft 108 is drivingly coupled to the corresponding sprocket wheel 132 by a chain 134 trained about each sprocket wheel 110 and the corresponding sprocket wheel 132, an adjustable chain tensioning wheel 136 mounted from the frame 76 being engaged with one reach of each chain 134, see FIG. 6.

In addition, each frame 86 and 88 includes a tensioned expansion spring 138 connected between an upright 140 supported from the frame and a transverse anchor bar portion 142 of the frame 76, see FIG. 6. Also, each cam follower assembly 118 is connected to a corresponding upright 140 through the utilization of a link chain 144. Thus, the expansion springs 138 yieldingly bias the corresponding cam follower assemblies 118 toward positions with the rollers 122 thereof engaged with the associated cam lobes 116 and the cam lobes 116 serve to longitudinally shift the corresponding cam follower assemblies 118 longitudinally of the frame 76 against the biasing action of the springs 138.

Each crank arm 112 has the upper end of an upstanding connecting rod 146 pivotally anchored thereto as at 148, see FIG. 6, and the lower end of each connecting rod 146 is pivotally connected to the free end of a crank arm 148 as at 150, each crank arm 148 being mounted on oscillatable shaft 152 supported from the frame 76 and also having a gear wheel 154 mounted thereon meshed with a smaller gear wheel 156 mounted on the corresponding shaft 96. Accordingly, upon rotation of each shaft 108 the corresponding crank arm 148 is oscillated between the solid and phantom line positions thereof illustrated in FIG. 6 and the associated gear wheel 154 is oscillated back and forth and thereby imparts oscillation to the corresponding gear wheel 156 and shaft 96. This, of course, causes the associated frames 86 and 88 to be vertically oscillated. However, at the same time the frames 86 and 86 are vertically oscillated, they are shifted back and forth longitudinally of the frame 76 by the corresponding cam lobes 116 and expansion springs 138. The net result of the vertical and longitudinal oscillation of the frame 86 and 88 is such that each frame is lowered to a position with the fingers 94 thereof extending below the level 42, shifted longitudinally of the tank 14 toward the outlet end 22 thereof, raised to a position with the fingers 94 thereof elevated above the level 42 and then shifted back toward the inlet end 20 of the tank 14 prior to the frame again being lowered to a position with the fingers 94 thereof projecting below the level 42 and being displaced toward the outlet end 22 of the tank 14. Of course, each pair of smaller and larger inner and outer frames 86 and 88 are inversely oscillated by the respective chains 100, cams 116 and expansion springs 138.

It will be noted that each motor 106 oscillates a corresponding shaft 152 and that each shaft 152 directly oscillated by the corresponding motor 106 is in turn connected to a second shaft 152 through a connecting rod 160. Each second shaft 152 also includes a gear wheel 154 meshed with a gear wheel 156 carried by a corresponding shaft 96 having a pair of additional sprocket wheels 98 mounted thereon. Of course, each additional sprocket wheel 198 has one of the link chains 100 anchored relative thereto. Accordingly, each pair of shafts 96 and the sprocket wheels 98 thereon support the opposite ends of the corresponding pair of inner and outer frames 86 and 88.

The tank 14 is approximately the same length as conventional potato slice cooking vats which utilize paddles or overlying conveyors to convey the potato slices being cooked. However, the aforementioned paddles and conveyors operatively associated with conventional cooking tanks of substantially the same length propel the potato slices the length of those conventional tanks at approximately twice the speed the finger equipped frames 86 and 88 convey the potato slices 32 the length of the tank 14. However, because of the novel manner in which the depending fingers 94 are projected down into the cooking oil 38, engage the slices 32, turn the slices 32 and generally agitate the slices 32, the slices 32 may be admitted into the tank 28 and subsequently into the tank 14 at generally the same rate that is possible with conventional tanks using paddles or overlying conveyors. However, the rate of movement of the slices 32 along the tank 14 is generally ½ the rate of movement in corresponding slices in conventional tanks. Accordingly, production rate of the apparatus 10 is substantially the same as the production rate of a conventional tank through which potato slices pass at twice the speed the slices 32 move the length of the tank 14.

With conventional potato slice cooking apparatus of generally the same type and utilizing paddles or overlying conveyors to convey the slices being cooked the length of those conventional tanks, the total number of potato slices in the conventional tank at any one time must be limited to approximately one-half the number of slices 32 which may be contained within the tank 14 in order to prevent the potato slices in conventional cooking tanks from becoming caked or stuck to each other. The aforementioned paddles and overlying conveyors are not capable of insuring that twice the conventional number of slices being cooked do not stick together. However, the use of the cyclic framed 86 and 88 and their fingers 94, as desired, enables generally twice the conventional number of potato slices 32 to be handled at one time in the tank 14.

Inasmuch as the tank 14 moves the potato slices 32 therethrough at approximately one-half the speed which is accomplished by conventional potato slice cooking apparatus, the temperature of the oil 38 may be maintained lower.

Figure 11:
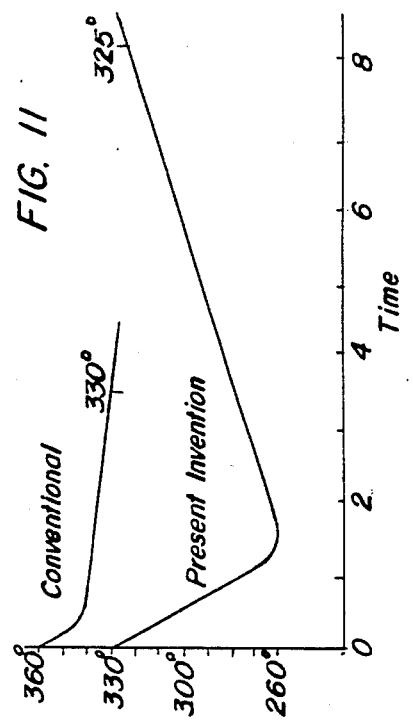
FIG. 11 is a diagrammatic view illustrating the cooking temperature and time of the apparatus of the instant invention in comparison to the cooking temperature and time accomplished by other presently used potato slice cooking vats.

With attention now invited more specifically to FIG. 11, it may be seen that the temperature of oil within the inlet end of a conventional potato slice cooking tank is approximately 360° F. and that the more gradual discharge of potato slices to be cooked initially abruptly lowers the temperature of the cooking oil to approximately 340° F., after which the temperature of the cooking oil is slowly lowered to approximately 330° throughout the approximate 3½ minute time it takes for potato slices to pass the length of a conventional potato slice cooking machine. However, with attention again invited to FIG. 11, with the apparatus 10 of the instant invention, the cooking oil is maintained at approximately 330° F. at the inlet end 20 into which the potato slices are discharged after a brief passage the length of the tank 28. The discharge of potato slices from the tank 28 into the inlet end 20 of the tank 14 is at the normal rate and thus the temperature of the oil 38 in the tank 12 drops from an initial 330° F. to approximately 260° F. during the initial movement of the potato slices 32 approximately 1/6th the length of the tank 14. Thereafter, because of the constant heating of the oil 38 by the tubes 44 and the tubes 56 and 58, the temperature of the oil within the tank experienced by the potato slices moving from the inlet end 20 to the outlet end 22 gradually increases to approximately 325° F.

By utilizing an initial lower temperature of 330° F. and by the slices 32 experiencing an initial rapid drop in the temperature of the cooking oil 38 from 330° F. to approximately 260° F., the moisture content of the interior of the slices 32 is not so quickly vaporized. The initial drop in temperature from 330° F. to approximately 260° F. occurs as a result of the initial vaporization of the water content of the slices 32 on the exterior of the slices 32 and it is not until the temperature begins to rise from the low point of 260° F. toward the 325° F. temperature at the outlet end 22 is the internal moisture content of the slices 32 vaporized. Accordingly, the internal moisture content of the slices 32 is more gradually vaporized over a period of time which is more than twice the period of time the interior moisture content of potato slices being cooked by conventional machines is vaporized. This results in a considerable reduction in the breaking up of the cells of the fibrous portions of the potato slices 32 and the slices 32 obsorbing generally one-third less cooking oil 38. Of course, the end product therefor contains one-third less cooking oil than potato chips cooked by conventional apparatuses and results in a considerable savings in cooking oil which must be occasionally added to the tank 14. Thus, on a large production run not only do the potato chips produced by the apparatus 10 have one-third less oil content, but a considerable reduction in the quantity of oil necessary to cook those potato chips is realized. This becomes very important when the potato chips are cooked in peanut oil or other expensive oils as opposed to lard, peanut oil being about three times as expensive as lard.

It is also pointed out that the apparatus 10 is utilized to cook potato slices which are somewhat thicker than conventionally cooked potato slices in the production of potato chips. This enables the same weight value of potato chips to be packaged in smaller bags and a greater weight quantity of potato chips to be transported to market in the same size transport container. Further, the slower cooking of the slices 32 causes less break up of the cells of the fibrous portions of the slices 32 and results in a stronger potato chip less likely to break when dipped into a prepared dip by the ultimate consumer. In addition, because the fingers 94 continuously depress and turn as well as agitate the slices 32 as they are being cooked, the slices 32 are allowed to curl more naturally and a more fully curled potato chip of the same thickness is stronger than a not so fully curled potato chip. Therefore, not only is a potato chip produced by the apparatus 10 less likely to break when being dipped into a prepared dip, but it is less likely to break in the bag in which it is placed during transport and storage before purchase by the ultimate consumer. Finally, because the slices 32 experience less rupture of the cells of the fibrous portions thereof and absorb less cooking oil, the taste of the ultimate product produced by the apparatus 10 is more natural and less diluted with the taste of the oil in which the chips 32 are cooked.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for frying a food product, said apparatus including an elongated cooking vat, heated cooking liquid disposed within said vat to a predetermined level and upon which said product will float, heating means in good heat transfer relation with said liquid for supplying heat energy thereto at a controlled rate, food product supply means for applying food product to one end of said vat at a controlled rate, product discharge means operatively associated with the other end of said vat for discharging cooked product therefrom, and combined cooking food product agitating, propelling and turning unit means including at least one set of dependingly supported fingers, said unit means being mounted from said vat for cyclic movement relative thereto consisting of sequential downward displacement from a starting position with said fingers spaced above said level to a position with said fingers extending through said level, longitudinal displacement along said vat, with said fingers extending through said level, toward the other end of said vat, upward displacement to a position with said fingers spaced above said level and longitudinal displacement along said vat toward said one end back to said starting position, said heating means including a plurality of laterally spaced longitudinally extending cylindrical heat tubes disposed within said vat below said predetermined level, each of said heat tubes including burner means in an end thereof adjacent said other end of said vat and combustion exhaust manifold means in said one end of said vat into which the adjacent ends of said tubes open, said vat including cooking liquid circulating means including pumping means for pumping a portion of said cooking liquid from said other end of said vat and discharging the pumped cooking liquid into said one end of said vat, an initial product receiving tank disposed adjacent said one end of said vat and including one marginal portion of said tank defining a weir-type outlet for discharging liquid from said tank into said one end of said vat, said tank including a second marginal portion opposite said one marginal portion into which said pumping means discharges the pumped liquid, the pumped liquid being movable through said tank from said second marginal portion to said one marginal portion and over said weir-type outlet into said one end of said vat.

2. An apparatus for frying a food product, said apparatus including an elongated cooking vat having heated cooking liquid disposed therein to a predetermined level, product supply means for supplying raw product to one end of said vat at a controlled rate, product discharge means operatively associated with the other end of said vat for discharging cooked product therefrom, a pair of vertically registered upper and lower small and large plan area open frames mounted from said vat for inverse cyclic movement, each of said frames including a plurality of depending fingers, each of said frames being movable from an initial starting position with the fingers thereof spaced above said level and sequentially downwardly displaceable to a position with the fingers thereof extending through said level, shiftable longitudinally of said vat toward said other end thereof with the fingers of the frame extending through said level, upwardly displaceable relative to said vat to a position with the fingers thereof spaced above said level and then shiftable longitudinally of said frame toward said one end thereof back to said starting position, variable speed drive means operatively associated with said frames for effecting the cyclic movement thereof, said drive means including means operative to adjust the length of displacement of said frames longitudinally of said vat as well as means operative to adjust the downward and upward displacements of said frames relative to said vat independent of adjustments in the length of displacement of said frames longitudinally of said vat.

3. An apparatus for frying a food product, said apparatus including an elongated cooking vat, heated cooking liquid disposed within said vat to a predetermined level and upon which said product will float, heating means in good heat transfer relation with said liquid for supplying heat energy thereto at a controlled rate, food product supply means for applying food product to one end of said vat at a controlled rate, product discharge means operatively associated with the other end of said vat for discharging cooked product therefrom, and combined cooking food product agitating, propelling and turning unit means including at least one set of dependingly supported fingers, said unit means being mounted from said vat for cyclic movement relative thereto consisting of sequential downward displacement from a starting position with said fingers spaced above said level to a position with said fingers extending through said level, longitudinal displacement along said vat, with said fingers extending through said level, toward the other end of said vat, upward displacement to a position with said fingers spaced above said level and longitudinal displacement along said vat toward said one end back to said starting position, said vat including cooking liquid circulating means incorporating pumping means for pumping a portion of said cooking liquid from said other end of said vat and discharging the pumped cooking liquid into said one end of said vat, and initial product receiving tank disposed adjacent said one end of said vat and including one marginal portion of said tank defining a weir-type outlet for discharging liquid from said tank into said one end of said vat, said tank including a second marginal portion opposite said one marginal portion into which said pumping means discharges the pumped liquid, the pumped liquid being movable through said tank from said second marginal portion to said one marginal portion and over said weir-type outlet into said one end of said vat.

4. The apparatus of claim 3 wherein said food product agitating, propelling and turning unit means includes a pair of inversely cyclically moving finger equipped units operatively associated with each end portion of said vat.

5. The apparatus of claim 3 including drive means operatively associated with each pair of finger equipped units for effecting the cyclic movement thereof and including means whereby the speed of said cyclic movements may be varied.

6. The apparatus of claim 3 including a support frame mounted from said vat for vertical shifting relative thereto, said pairs of units being mounted from said frame for cyclic movement relative thereto.

7. The apparatus of claim 3 wherein said heating means includes a plurality of laterally spaced longitudinally extending cylindrical heat tubes disposed within said vat below said predetermined level.

8. The apparatus of claim 7 wherein said heating tubes include inclined liquid flow tubes secured thereto upwardly through which the cooking liquid in said vat may pass by convection currents.

9. The apparatus of claim 7 wherein each of said heat tubes includes burner means in an end thereof adjacent said other end of said tank and combustion exhaust manifold means in said one end of said vat into which the adjacent ends of said tubes open.

10. The apparatus of claim 3 including variable speed drive means operatively associated with said unit means for effecting the cyclic movement thereof.

11. The apparation of claim 10 wherein said drive means includes means operative to adjust the length of said longitudinal displacement independent of variations in the length of said downward and upward displacements.

* * * * *